(12) United States Patent
Fey et al.

(10) Patent No.: US 10,083,509 B2
(45) Date of Patent: Sep. 25, 2018

(54) IMAGE CALIBRATION (71) Applicant: Application Solutions (Electronics and Vision) Ltd., Lewes (GB)

(72) Inventors: Wolfgang Fey, Bodolz (DE); Eric Hantsch, Brighton (GB); Vaclav Mocek, Seaford (GB); Gideon Reade, Worthing (GB); Ian Saward, Lewes (GB); Ravikanth Uppara, Seaford (GB); Dave Weller, Lewes (GB)

(73) Assignee: Application Solutions (Electronics and Vision) Ltd., Lewes (GB)

( * ) Notice: Subject to any disclaimer, the term of this patent is extended or adjusted under 35 U.S.C. 154(b) by 344 days.

(21) Appl. No.: 14/691,938

(22) Filed: Apr. 21, 2015

(65) Prior Publication Data
US 2015/0324984 A1 Nov. 12, 2015

(30) Foreign Application Priority Data

May 6, 2014 (EP) .................................... 14167159

(51) Int. Cl.
| | | |
|---|---|---|
| *H04N 7/18* | (2006.01) | |
| *H04N 17/00* | (2006.01) | |
| *H04N 17/02* | (2006.01) | |
| *G06T 7/00* | (2017.01) | |
| *B60R 1/00* | (2006.01) | |
| *G06T 7/80* | (2017.01) | |

(52) U.S. Cl.
CPC .............. *G06T 7/0018* (2013.01); *B60R 1/00* (2013.01); *G06T 7/80* (2017.01); *H04N 17/002* (2013.01); *B60R 2300/402* (2013.01); *G06T 2207/10004* (2013.01); *G06T 2207/10016* (2013.01); *G06T 2207/30244* (2013.01)

(58) Field of Classification Search
CPC ................................................. B60R 2300/402
See application file for complete search history.

(56) References Cited

U.S. PATENT DOCUMENTS

| | | | | |
|---|---|---|---|---|
| 2004/0212686 A1* | 10/2004 | Usami | ...................... | B60R 1/00 348/208.99 |
| 2005/0237385 A1 | 10/2005 | Kosaka | | |
| 2006/0038895 A1* | 2/2006 | Suzuki | ...................... | B60R 1/00 348/222.1 |
| 2009/0160940 A1* | 6/2009 | Imamura | ................... | B60R 1/00 348/159 |
| 2009/0290032 A1* | 11/2009 | Zhang | ...................... | B60R 1/00 348/211.9 |

(Continued)

FOREIGN PATENT DOCUMENTS

WO 2009142921 11/2009

OTHER PUBLICATIONS

Extended European Search Report for European Application No. 14167159.4-1902 dated Aug. 19, 2014.

*Primary Examiner* — Rebecca A Volentine
(74) *Attorney, Agent, or Firm* — RatnerPrestia (57) ABSTRACT

A method and apparatus for calibrating an image from a camera mounted on a vehicle using camera pose parameter determined from information relating to suspension level from a suspension system of the vehicle. The difference in the suspension level compared with a suspension level datum can be determined and an adjustment to the camera pose parameter values can be obtained from the difference in the suspension level.

12 Claims, 8 Drawing Sheets

(56) References Cited

U.S. PATENT DOCUMENTS

| | | |
|---|---|---|
| 2010/0091017 A1 | 4/2010 | Kmiecik |
| 2010/0245592 A1* | 9/2010 | Inui .......................... G06T 7/80 |
| | | 348/187 |
| 2011/0216201 A1* | 9/2011 | McAndrew ........... G06T 7/0018 |
| | | 348/148 |
| 2012/0127310 A1* | 5/2012 | Kim ......................... B60R 1/00 |
| | | 348/148 |
| 2012/0224064 A1 | 9/2012 | Euler |
| 2014/0218507 A1* | 8/2014 | Watanabe ............... B60K 35/00 |
| | | 348/116 |
| 2014/0247352 A1* | 9/2014 | Rathi ....................... B60R 1/00 |
| | | 348/148 |
| 2014/0327765 A1* | 11/2014 | Hsien ................... G06T 7/0018 |
| | | 348/143 |
| 2015/0088378 A1* | 3/2015 | Sugai ................... B60G 17/018 |
| | | 701/37 |
| 2015/0208041 A1* | 7/2015 | Wang ..................... H04N 7/183 |
| | | 348/148 |
| 2016/0001704 A1* | 1/2016 | Nakasho ............. G07C 5/0891 |
| | | 701/36 |
| 2016/0060824 A1* | 3/2016 | Akashi ................... E01C 23/01 |
| | | 348/148 |

* cited by examiner

IMAGE CALIBRATION

TECHNICAL FIELD

This disclosure relates to a method of calibrating images, and in particular to a method of calibrating an image from a camera mounted on a vehicle, and to a corresponding apparatus.

BACKGROUND

Driver assist camera systems are increasingly being provided in modern vehicles to provide the driver with assistance, for example in driving or in parking the vehicle. In particular, driver assist systems are able to provide a driver with a view of the position of the vehicle, relative to other vehicles or to features of the road such as the curb, to help the driver in maneuvering or parking the vehicle. In some driver assist camera systems, graphical data is displayed to the user, for example to indicate the projected path of the vehicle on the ground when parking or overtaking.

Driver assist camera systems typically include one or more cameras, mounted on the vehicle, that capture images of the surroundings of the vehicle. The images captured by the camera are calibrated so that the images accurately represent the surroundings of the vehicle, and so that they can be combined with other images and/or with graphical data for display. Driver assist camera systems typically perform a geometrical projection of a camera image onto a plane representing the ground on which the vehicle is located, and may perform an overlay of additional graphical data, such as graphical data illustrating the projected path of the vehicle on the ground, on the image data.

The height of the camera relative to the ground when the image was taken and the height of the camera relative to the projection plane onto which the image is to be projected are used to perform an accurate geometrical projection of an image on to a plane. Inaccuracy in this height information makes the alignment of composite pictures made by combining images from more than one camera more difficult, because the edges or overlap between the original images will not correspond. In addition, the positioning of graphical information overlaid on a camera image or on a composite camera image can be inaccurate.

In some driver assist camera systems, the height of the camera above the ground is measured in a calibration stage during manufacture. Although this method is simple to carry out, the height measurement becomes inaccurate with load, ride height changes and other variations.

In other driver assist camera systems, a camera height measurement for use in calibrating images may be updated in service from the images taken by the camera. One such system is disclosed in WO2009/142921, which is incorporated by reference, which relates to a system and a method for calibrating a camera on a vehicle while the vehicle is being driven. Images from a camera mounted on the vehicle are analysed to determine a ground plane, and the height of the camera above the determined ground plane can be found.

Although systems such as this can produce good results, the processing of the images to determine the height of the camera may take some time, and the height of the camera tends to be updated infrequently. In addition, techniques to analyse the position of a ground plane from images taken by a camera may work poorly on some surfaces. Furthermore, rotations or deflections of the camera caused by load or handling variations are not always considered. These factors mean that the calibration of images from the camera may be inaccurate for periods of time.

The present invention seeks to alleviate or ameliorate at least some of the disadvantages of the prior art, and to provide a method of calibrating images.

SUMMARY

In accordance with a first aspect of the invention, there is provided a method comprising: calibrating an image from a camera mounted on a vehicle using at least one camera pose parameter; wherein a value of the at least one camera pose parameter is determined using suspension level information of a suspension system of the vehicle.

In accordance with a second aspect of the invention there is provided an apparatus comprising a camera pose parameter function, coupled to receive suspension level information from a vehicle suspension system of a vehicle and to determine a value of at least one camera pose parameter from the suspension level information; and an image processor, coupled to receive the value of at least one camera pose parameter from the camera pose parameter function, and operable to calibrate images from a camera mounted to the vehicle using the value of the at least one camera pose parameter.

In accordance with embodiments of the invention, camera images are calibrated using camera pose information derived from a vehicle system to adjust images, so that images can be displayed accurately. In accordance with embodiments of the invention, the alignment between calibrated images that have been joined or combined, and/or the accuracy of registration between images and graphical data, may be improved.

The calibration of images using camera pose parameter values derived from suspension level information from the suspension system may be performed frequently and at regular intervals. The calibration therefore is responsive to changes in the vehicle load or in the vehicle handling. Suspension data can be updated irrespective of the surface on which the vehicle stands.

In some embodiments, the values of the pose parameters of the camera are updated by collecting information, for example via a vehicle communication network, from the suspension system. In some embodiments, values for the camera pose parameters are determined during production and during in-service calibration exercises so the pose parameter values determined from both suspension and video analysis sources can be correlated. In some embodiments, the suspension data provides highly responsive relative corrections to initial camera pose parameter values determined by video analysis based calibration.

The implementation of an embodiment of the invention in a vehicle that already has suspension data available within a vehicle communications network involves minimal marginal cost per vehicle since no extra physical elements are required.

Embodiments of the disclosure are described below, with reference to the accompanying drawings, by way of example only.

DETAILED DESCRIPTION

In embodiments of the invention, images from a camera are calibrated using camera pose parameter values derived from suspension level information. The calibrated images can be accurately combined with at least one other image and/or with graphical data.

The combination of position and orientation of an object is referred to as the pose of the object. Thus the camera pose describes the position and orientation of the camera in 3-dimensional (3D) space. Variations in the position and orientation of the camera in 3D space can be described using three position pose parameters, describing the position of the camera along the x, y, and z axes respectively, and three orientation pose parameters, describing the pitch, roll, and yaw of the camera respectively. In the context of the calibration of a camera, the most important parameters are the camera height pose parameter, and the pitch and roll pose parameters.

Figure 1:
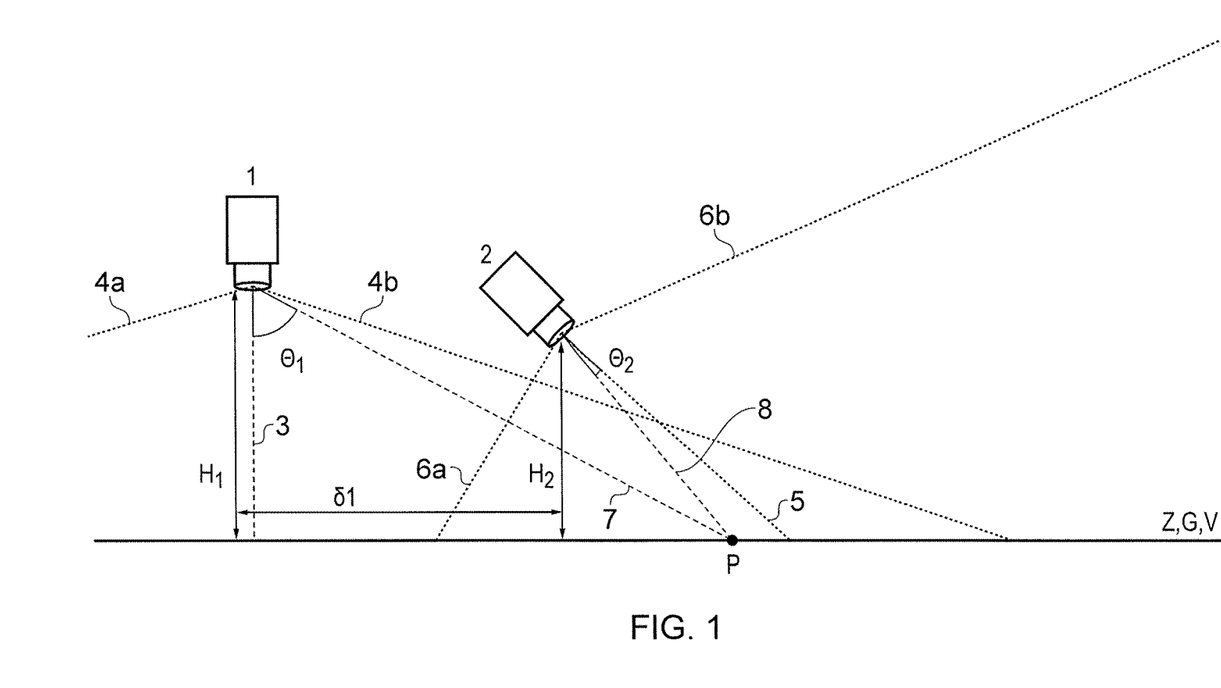
FIG. 1 is a side elevation view of a camera system.
Figure 2:
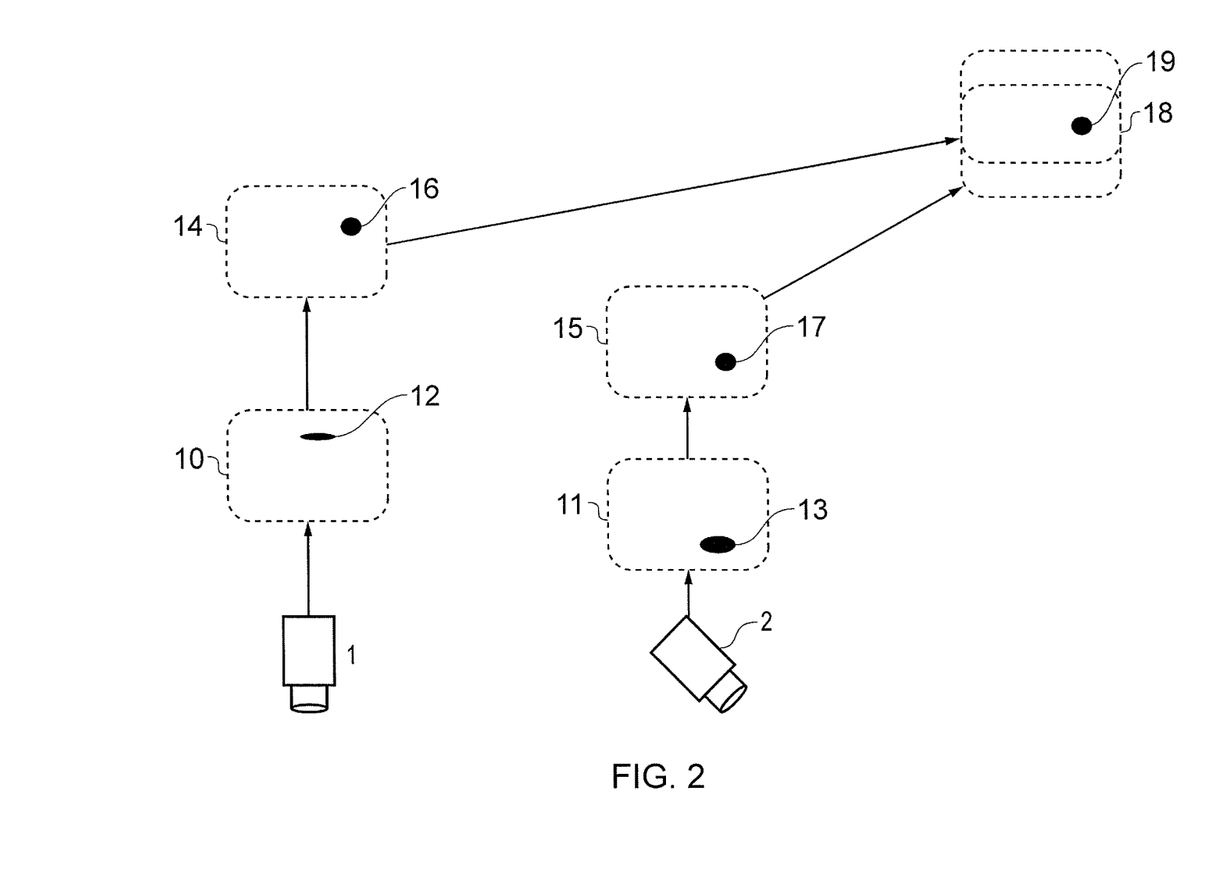
FIG. 2 is a schematic diagram illustrating the processing of images captured in the camera system of FIG. 1.

The principles involved in combining images from different cameras will be explored in more detail with reference to FIGS. 1 and 2. In this example, only a single camera pose parameter, relating to the camera height, is considered.

FIG. 1 is a side elevation view of a camera system having a first camera 1 and second camera 2.

The first camera 1 is mounted at a distance $H_1$ from a datum Z, with its optical axis 3 being perpendicular to the datum Z. The first camera 1 has a field of view shown by dashed lines 4a, 4b. The second camera 2 is mounted at a distance $H_2$ from the datum Z, with its optical axis 5 at an angle to the datum Z. The second camera 2 has a field of view shown by dashed lines 6a, 6b. The distance separating the cameras 1, 2 in the direction parallel to the ground plane G is δI.

A ground plane G is provided, which represents the ground level on which the vehicle sits. In this illustration, the ground plane G is the datum Z.

The cameras 1, 2 both take images of a part of the ground plane G containing a circular object P. Dashed line 7 represents the path of light from point P to camera 1 and dashed line 8 represents the path of light from point P to camera 2. The angle formed between path of light 7 and optical axis 3 is shown as θ1, and the angle formed between path of light 8 and optical axis 5 is shown as θ2.

A geometrical transformation of an image captured by camera 1 or camera 2 will now be explained in more detail. The illustrated geometrical transformation is a plane projection i.e. images from the cameras 1, 2 are geometrically transformed so as to be displayed as if on a projection plane V, as shown in FIG. 1, viewed from a point overhead. In this illustration the projection plane V used for the overhead view is the same as the ground plane G as shown in FIG. 1. It is not necessary that the projection plane V is the ground plane G, but this is an especially useful case for road vehicles. However, the principles described are also applicable to projections onto other planes.

FIG. 2 illustrates the processing of the images captured by cameras 1, 2 to produce a merged image.

Images 10 and 11 represent the images captured by respective cameras 1, 2 of the arrangement shown in FIG. 1. In image 10 point P is naturally foreshortened owing to the angle of view of the camera 1, and is shown as an oval point Pa 12. In image 11 point P is naturally foreshortened owing to the angle of view of the camera 2, and is shown as an oval point Pb 13.

Images 14 and 15 represent the projection of the respective image 10, 11 on the projection plane V as if viewed from overhead, which removes the foreshortening effect caused by the angle of view of the cameras.

Techniques useful in carrying out a projection of an image onto a plane will be known to a skilled person. For example, in some embodiments a pixel-by-pixel mapping may be used to carry out a projection onto the projection plane V, as will be described in more detail with reference to FIGS. 1 and 2.

Thus, to identify picture information for a point within an image in the projection plane V, firstly the angle between a ray of light travelling from the point on the recorded image to the camera and the optical axis of the camera recording the image is determined. The calculation of this angle depends upon the height of the camera above the ground plane G, since the point is in the ground plane G. The height of the camera above the ground plane is the same as the height of the camera above the datum Z in FIG. 1, and so the angles can be calculated accurately.

Point P is represented as point Pa 12 in image 10 in FIG. 2, and the angle formed between path of light 7 and optical axis 3 of camera 1 is angle θ1, as described above with reference to FIG. 1. Point P is represented as point Pb 13 in image 11 in FIG. 2, and the angle formed between path of light 8 and optical axis 4 of camera 2 is shown as angle θ2 as described above with reference to FIG. 1.

Next, using the angle between a ray of light travelling from the point on the recorded image to the camera and the optical axis of the camera recording the image, together with a knowledge of the distance of the projection plane V away from the cameras 1, 2, the picture information in recorded images 10 and 11 can be transformed into picture information in projected images 14, 15 respectively. It can be seen in FIG. 2 that point P is transformed from an oval point Pa 12 in recorded image 10 to a circular point Pc 16 in projected image 14, and that point P is transformed from an oval point Pb 13 in recorded image 11 to a circular point Pd 17 in projected image 15.

As will be apparent, where the projection plane V is the same as the ground plane G, the distribution of points within the projection plane V will be proportional to the corresponding positions on the ground plane G.

The spatial relationship between these projected images 14, 15 is known from the distance δI separating the cameras 1, 2 in the direction parallel to the ground plane G and from the angle (not shown) at which the cameras 1, 2 are oriented with respect to each other.

Taking the spatial relationship between the projected images 14, 15 into account, the projected images 14, 15 may be combined to form a combined or merged output image 18. Where the projected images 14, 15 overlap, it is possible to join them together using a number of different techniques, as will be apparent to a skilled person. In some embodiments, in order to achieve a good alignment of the projected images 14, 15, the picture information from the projected images 14, 15 in overlapping regions can be combined using alpha blending, or other techniques for combining picture information from two images.

FIG. 2 shows the merged image 18 formed by combining the projected images 14 and 15 as described above. The projected point Pc 16 in projected image 14 and projected point Pd 17 in projected image 15 overlap and therefore are seen as a single point P 19 in the merged image 18.

The above described system works well provided that the measurements on which the projection onto the plane V is based are accurate. Problems that may arise in combining images that have been projected onto a projection plane will now be described with reference to FIGS. 3 and 4, which correspond to FIGS. 1 and 2 described previously. These problems arise owing to variability in the height above the projection plane, such as occurs if the cameras are mounted on a vehicle. As will be understood by a skilled person, similar problems arise owing to variability in the other camera pose parameter values, as will be described further with reference to FIG. 6.

As will be understood by a skilled person, a vehicle body is mounted on springs and tyres so at times the ground plane G shown in FIG. 1, which represents the actual ground level on which a vehicle is located, is no longer the same as the datum Z shown in FIG. 1, which represents the "nominal" ground level on which the vehicle is located. As a result the respective measurements of the height of the cameras 1, 2 relative to the datum Z are no longer an accurate measure of the distance between the cameras 1, 2 and the ground. Instead the actual height between the cameras mounted on the vehicle and the ground will vary with time.

Figure 3:
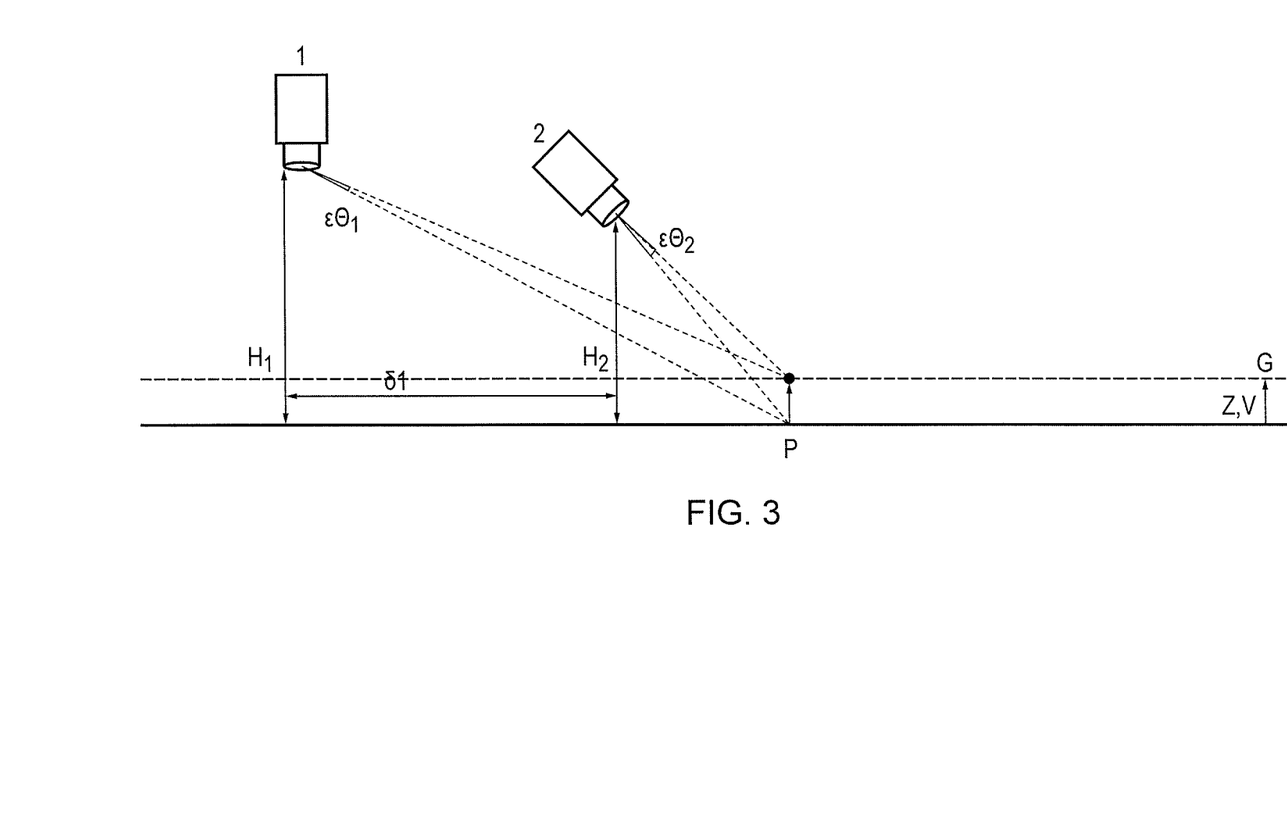
FIG. 3 is a side elevation view of a camera system illustrating a change in ground plane.

In FIG. 3, the point P is on the ground plane G that is now closer to the cameras 1, 2 than the datum Z. It will be understood that FIG. 3 shows a situation where a vehicle body, and therefore also the cameras 1, 2 mounted to the vehicle body, is closer to the ground than expected, for example because of a load. As mentioned above, for simplicity, FIG. 3 illustrates a vertical displacement of the cameras 1, 2, although an angular deflection of the cameras 1, 2, which might occur when a vehicle on which the cameras 1, 2 are mounted has tilted, causes similar problems. In practice, vertical displacements and angular deflections and the resulting variation in camera pose parameter values, both occur as a result of loads or variations in the driving or handling of the vehicle.

As shown in FIG. 3, the change in the position of the ground plane G relative to the datum Z results in a change in the angle between the incident ray of light from point P at the cameras 1, 2 and the respective optical axis 3 of camera 1 or the optical axis 5 of camera 2. The angular difference between the situation where the ground plane G containing point P is at the datum Z as shown in FIG. 1, and the situation where the ground plane G containing point P is at a different height from the datum Z, as shown in FIG. 3, is labelled as angle $\epsilon\theta1$ for camera 1 and is labelled as angle $\epsilon\theta2$ for camera 2 respectively.

Figure 4:
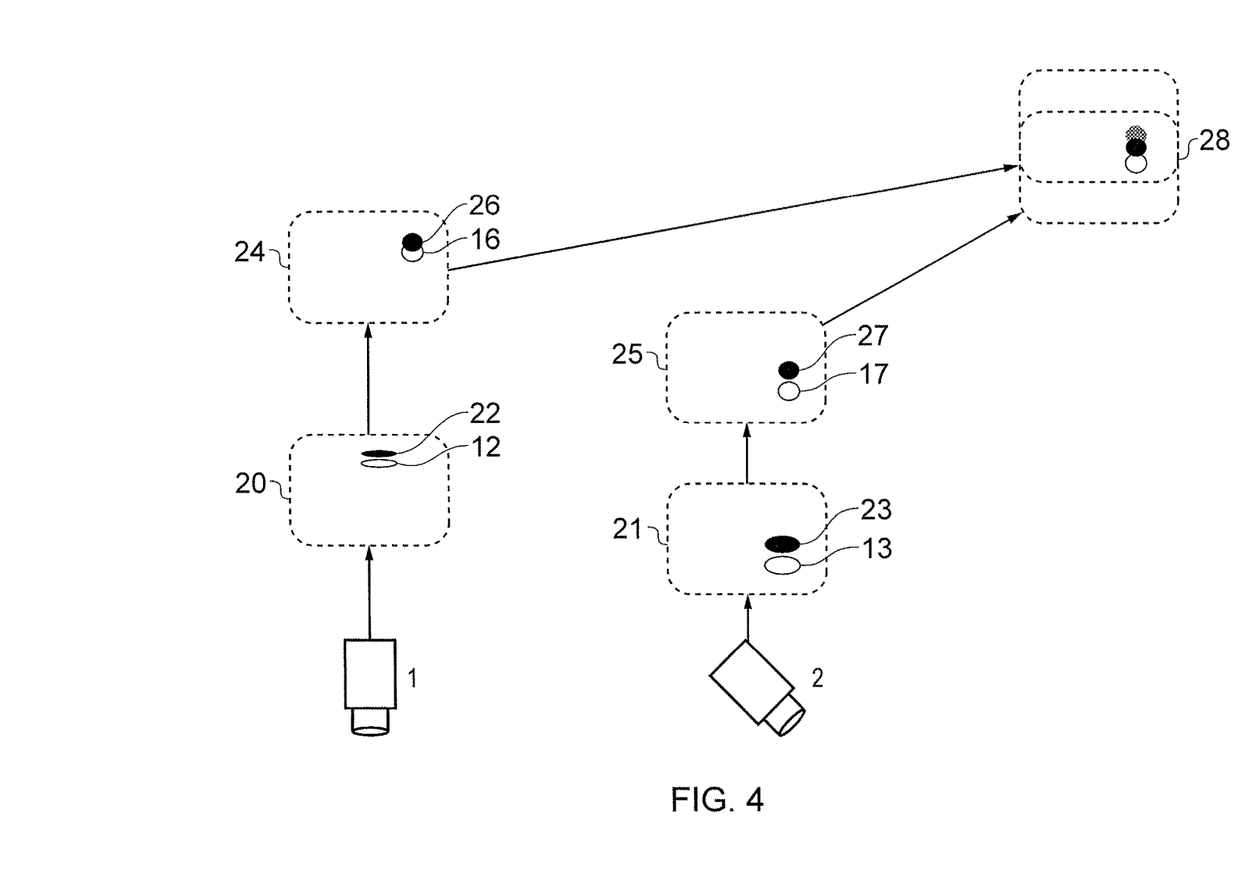
FIG. 4 is a schematic diagram illustrating the processing of images captured in the camera system of FIG. 3.

FIG. 4 illustrates the processing of images captured from cameras 1, 2 to produce a merged image.

Images 20 and 21 represent the images captured by respective cameras 1, 2 of the arrangement shown in FIG. 3. In image 20, point P is naturally foreshortened owing to the angle of view of the camera 1, and is shown as an oval point Pe 22. In image 21 point P is naturally foreshortened owing to the angle of view of the camera 2, and is shown as an oval point Pf 23. The position of points Pa 12, Pb 13 as shown in FIG. 2, which represent the position of point P in the image captured by cameras 1, 2 when the ground plane is on the datum Z are also shown in FIG. 4 for reference.

As described above with reference to FIG. 2, techniques useful for carrying out a projection to a plane will be known to a skilled person. In one technique as described above, in order to identify picture information for a point within an image in the projection plane V, firstly the angle between a ray of light travelling from the point on the recorded image to the camera and the optical axis of the camera recording the image is determined.

In the situation shown in FIG. 3, the angle between the respective optical axis of cameras 1, 2 and incident light from the point P on the ground plane G has changed by the angle $\epsilon\theta1$ for camera 1 and by the angle $\epsilon\theta2$ for camera 2, respectively.

When the angle between incident light from the point P to the camera and the optical axis of the camera recording the image is used with the distance of the projection plane V away from the camera, the picture information in recorded images 20 and 21 can be transformed into picture information in projected images 24, 25 respectively.

Images 24 and 25 represent the projection of the respective image 20, 21 onto the projection plane V as if viewed from overhead, which removes the foreshortening effect caused by the angle of view of the cameras 1, 2. However, in the situation shown in FIGS. 3 and 4, the projection plane V is at the same height as the datum Z, and is therefore not at the same height relative to the cameras 1, 2 as the ground plane G.

Thus, in FIG. 4 point P is transformed from an oval point Pe 22 in recorded image 20 to a circular point Pg 26 in projected image 24, and point P is transformed from an oval point Pf 23 in recorded image 21 to a circular point Ph 27 in projected image 25. The position of points Pc 16, Pd 17, which represent the correct position of point P in the projected images 24, 25, are also shown in FIG. 4 for reference. It can be seen that the change in angle of the incident light at the cameras 1, 2 caused by the change in the height of the ground plane G relative to the cameras 1, 2 has resulted in the projected point Pg 26 in projected image 24 not being in the same position as point Pc 16 in projected image 14, and the projected point Ph 27 in projected image 25 not being in the same position as point Pd 17 in projected image 15.

Thereafter, taking the spatial relationship between the projected images 24, 25 into account, the projected images 24, 25 may be combined to form a combined or merged output image 28, in a similar manner to that described above with reference to the combining of projected images 14, 15 to form the merged image 18.

FIG. 4 shows the merged picture 28 formed by combining the projected images 24 and 25 as described above. As is clearly seen from the merged picture 28, when the projected images 24, 25 are merged, not only has the image of point P moved from its correct position, but it is now a double image, as the projected images Pg 26, Ph 27 of point P are in different places.

The problem of the misaligned projection can be corrected if the camera pose parameter values are accurate and up to date. As remarked earlier, for rigid vehicles, the only measurements that change quickly or substantially are those affected by vehicle body movements, and the main element of that is the compression of the vehicle suspension.

Suspension level information can be used to correct the pose parameter values for cameras 1, 2 in the calculations, or the suspension level information can be used to move the projection plane V to the position of the ground plane G.

Figure 5:
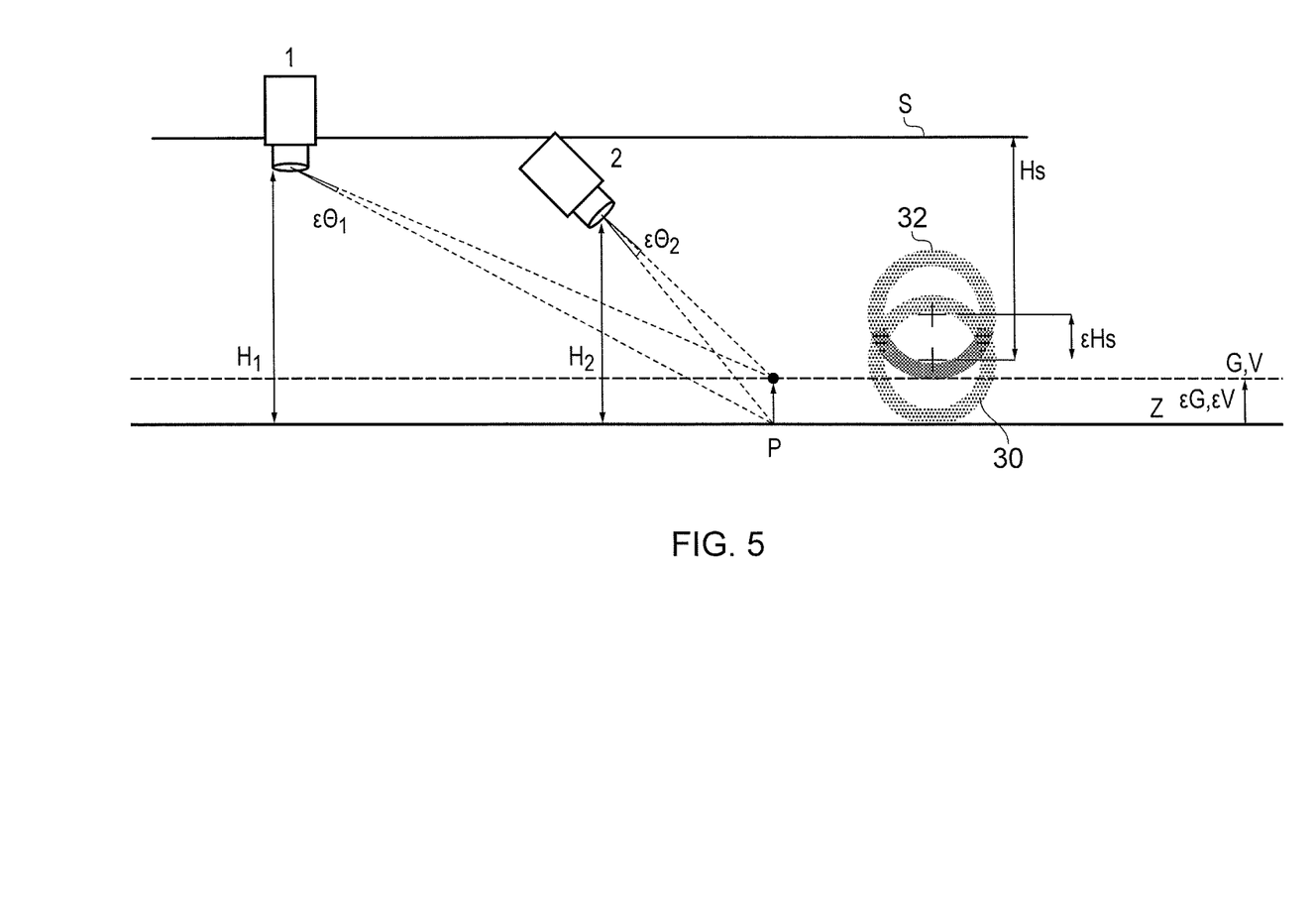
FIG. 5 is a side elevation view of a camera system illustrating a variation in the suspension level of a vehicle suspension system.

FIG. 5 shows how errors in camera calibration can be overcome by correcting camera pose parameter values using the variation in the suspension level of a vehicle suspension. FIG. 5 relates to the camera height parameter as an exemplary camera pose parameter. The arrangement shown in FIG. 5 generally corresponds with the arrangement shown in FIG. 3, and therefore features in common with FIG. 3 will not be described in detail with reference to FIG. 5.

In FIG. 5 a suspension datum S is shown, which bears a fixed relationship with the position of cameras 1 and 2. A single wheel of the vehicle to which the cameras 1 and 2 are mounted is shown in two different positions, namely a first position 30 and a second position 32, illustrating the change in the vertical height of the wheel of the vehicle relative to the suspension datum over time in response to changes in the loading of the vehicle or in the vehicle handling, for example.

In a first position 30, the wheel is in a position where it rests on a ground level corresponding to the datum Z. At this position, the operating height of the suspension Hs is known or can be measured. In FIG. 5 the operating height of the suspension Hs is shown as the height difference between the centre of the wheel in first position 30 and the suspension datum S.

In a second position 32, the position of the ground plane G has been raised relative to the datum Z, corresponding to a situation where a vehicle body, and therefore also the cameras 1, 2 mounted to the vehicle body, is closer to the ground than expected, for example because of a load. In this position, the centre of the wheel is closer to the suspension datum S by a distance of εHs, as is shown in FIG. 5, relative to the initial operating height of the suspension Hs when the wheel is at position 30.

Since the position of the suspension datum S is fixed relative to the cameras 1, 2, the change in the operating height of the suspension between positions 30 and position 32 can be taken as a measure of the camera deflection relative to the ground plane G. As a result the difference εHs in the operating height of the suspension Hs can be used to adjust the values of camera pose parameters, and/or to adjust the position of the projection plane V.

Therefore, in embodiments of the invention, any variation in the camera pose parameter values may be corrected by direct measurement of the operating height of the suspension system of the vehicle. The direct measurements may be provided by existing systems on the vehicle, and passed via electronic network to the picture processing system.

In some embodiments, measurement of an initial baseline position of both camera positions H1 and H2, and operating height of the suspension system Hs is necessary and these measurements may be stored in, or be accessible for use by, a picture processing system.

In some embodiments, an initial camera pose measurement may be carried out as an initial measurement when the vehicle is built. In some embodiments, an initial camera pose measurement may be taken during operation, for example the camera pose may be measured by analysing images captured by the camera. In some embodiments, the vehicle design information may be accurate enough to avoid the need to make any physical measurement to determine an initial camera pose.

During operation, the current suspension operating level may be measured. By comparison with the datum suspension level, the difference between the current suspension operating level and a previous suspension operating level can be determined. In these embodiments, the absolute value of suspension operating level Hs is not important as only the difference or change εHs in the suspension operating level is required.

FIG. 5 shows only one wheel and suspension operating level measurement Hs for the sake of clarity. In some embodiments individual measurements for some or all parts of the suspension can be taken allowing vertical and angular deflection at each camera position to be determined.

Figure 6A:
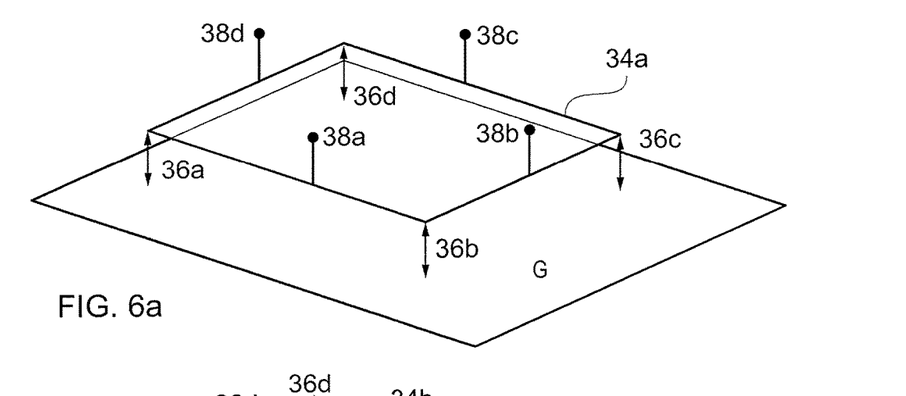
FIG. 6a is a schematic diagram illustrating a vehicle datum plane of the vehicle.
Figure 6B:
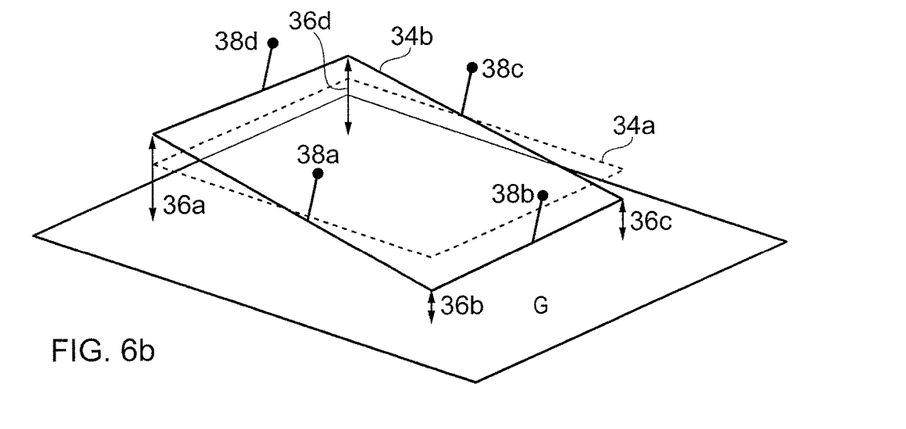
FIG. 6b is a schematic diagram showing the effect of change in the vehicle pitch on the vehicle plane.
Figure 6C:
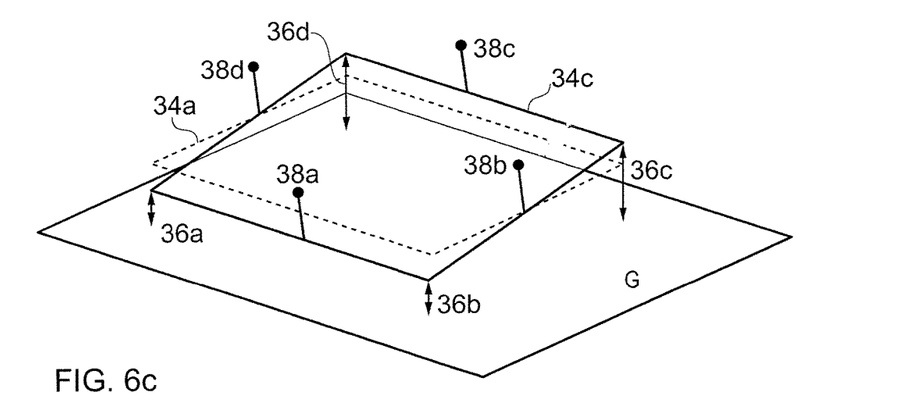
FIG. 6c is a schematic diagram showing the effect of change in the vehicle roll on the vehicle plane.

FIGS. 6a, 6b, and 6c are schematic diagrams illustrating the effect of load and handling variations on the values of camera pose parameters.

FIG. 6a is a schematic diagram illustrating the ground plane G and above it the vehicle datum plane 34a of the vehicle at its datum position. The wheel suspension heights 36a, 36b, 36c, and 36b are shown as arrows and each wheel suspension height is at its respective reference position. As discussed, this can be the suspension height of the respective wheels during a factory calibration.

Four cameras 38a, 38b, 38c, and 38d are shown, which are rigidly attached to the vehicle at various positions. The cameras 38a, 38b, 38c, and 38d have known X, Y, Z position parameter values, and Pitch, Roll, Yaw orientation parameter values relative to the vehicle datum plane 34a. Together, the position parameters and the orientation parameters form the pose parameters of the respective camera.

FIG. 6b is a schematic diagram showing the effect of change in the vehicle pitch on the vehicle plane 34b, with the original datum plane 34a shown as a dotted line. The change in the vehicle pitch could result from loading the boot of the vehicle, for example. The wheel suspension heights 36a, 36b, 36c, and 36b have changed, causing the vehicle plane 34b to change pitch angle with respect to the datum vehicle plane 34a. The cameras have therefore changed height and pitch angle, since they are rigidly connected to the plane of the vehicle.

The position of the new vehicle plane 34b can be computed from the wheel suspension heights 36a, 36b, 36c, and 36b using geometric relationships. The new values for the camera pose parameters for each of the cameras 38a, 38b, 38c, and 38d can be computed from the new vehicle plane 34b. The corrected values for the camera pose parameters can be used instead of the datum camera pose parameter values to provide a more accurate mapping for a merged surround view.

FIG. 6c is a schematic diagram showing the effect of change in the vehicle roll on the plane of the vehicle. This change in the vehicle roll could result from a driver or passenger sitting in the vehicle, for example. The wheel suspension heights 36a, 36b, 36c, and 36b have changed, causing the vehicle plane 34c to change roll angle with respect to the datum vehicle plane 34a. The cameras have therefore changed height and roll angle since they are rigidly connected to the plane of the vehicle.

The position of the new vehicle plane 34c can be computed from the wheel suspension heights 36a, 36b, 36c, and 36b using geometric relationships. The new values for the camera pose parameters for each of the cameras 38a, 38b, 38c, and 38d can be computed from the new vehicle plane 34c. The corrected values for the camera pose parameters can be used instead of the datum camera pose parameter values to provide a more accurate mapping for a merged surround view.

The suspension heights 36a, 36b, 36c, and 36b of the 4 wheels can be used to compute the deflected plane of the vehicle with any combination of pitch and roll, as will be apparent to a skilled person, and so a composite angular deflection of the vehicle plane, illustrating a combination of pitch and roll, has not been shown.

As will be apparent to a skilled person, the camera pose parameters relating to the height, the pitch, and the roll of the camera are the camera pose parameters that are most affected by variations in the vehicle load or handling.

In some embodiments, as described above, the suspension height of each of the four wheels may be measured separately, in order to allow vertical and angular deflection at each camera position to be determined. In other embodiments only suspension heights at wheels that are most affected by load are measured. Typically the rear wheels are more affected by load than the front wheels. In other embodiments, for example on multi-wheeled vehicles, the suspension height of one wheel of a co-located set, or of a bogie, may be measured. In embodiments relating to multi-suspension vehicles, for example a forward control truck with suspended cab, the height of both the wheel suspension and the cab suspension may be determined independently.

In some cases, for example sophisticated limousines, the suspension height may not be a measurement of the actual position, but a height or mode value set by the driver or an automatic system, and the suspension system itself is then relied upon to maintain this height.

In some embodiments, the suspension information may be used to derive vehicle load information, and then vehicle load information and the current or intended tyre pressure can be used to estimate the change in pose parameter values from compression of the tyres, to improve the accuracy of the overall measurement. Some vehicles have tyre pressure sensors that could be useful for this.

An embodiment of the invention will now be described with reference to FIGS. 7 and 8.

Figure 7:
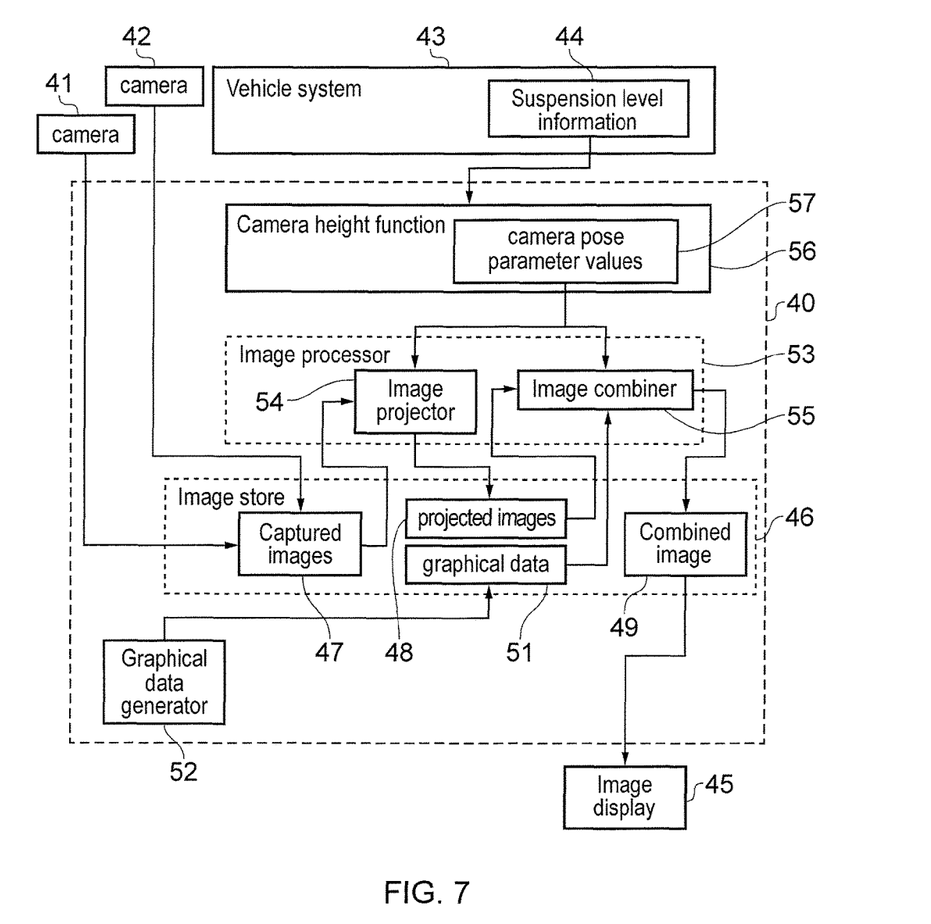
FIG. 7 is a schematic block diagram of an apparatus that can be used to implement the present invention, in accordance with one embodiment of the invention.

FIG. 7 is a schematic block diagram of an apparatus that can be used to implement the present invention, in accordance with one embodiment of the invention.

An image calibration apparatus 40 is provided for calibrating images from a camera mounted on a vehicle, as will described in more detail in the following description. Typically the image calibration apparatus 40 is mounted on the vehicle, and may be implemented either as a stand-alone system or as a function of another apparatus, as selected by a skilled person.

In this embodiment, the image calibration apparatus 40 is coupled to a first camera 41 mounted on a vehicle and to a second camera 42 mounted on the vehicle, and is arranged to receive images captured by cameras 41 and 42. Clearly, the image calibration apparatus 40 may be coupled to any number of cameras in different embodiments.

The image calibration apparatus 40 is also coupled to a vehicle system 43, and is arranged to receive suspension level information 44 from the vehicle system 43. In one embodiment, the vehicle system 43 is the vehicle suspension system. However, any vehicle system that is able to provide suspension level information suitable for use in an embodiment of the present invention may be used. In particular, the vehicle system 43 may in some embodiments be a vehicle dynamics system.

Generally, it is likely that the suspension level information 44 is information that the vehicle system 43 is already gathering or producing. In some embodiments, it may be necessary to process data from vehicle system 43 to obtain suspension level information 44. This processing may be carried out by vehicle system 43 or by image calibration apparatus 40, as appropriate. The suspension level information 44, in some embodiments, may be information relating to the operating height of the vehicle suspension.

The image calibration apparatus 40 is also coupled to an image display 45. The image display 45 is arranged to display to a user, typically the driver of the vehicle, the calibrated images, or a combination of calibrated images with other calibrated images and/or graphical data, which are generated by the image calibration apparatus 40.

The image calibration apparatus 40 is provided with an image store 46 for storing the image data used in and produced by the image calibration process carried out by the image calibration apparatus 40. Thus the image store 46 is provided with a captured image store 47 arranged to receive and store captured images from the first camera 41 and the second camera 42. The image store 46 is also provided with a projected image store 48 arranged to store projected images created during the image calibration process carried out by the image calibration apparatus 40, as will be discussed below in more detail. The image store 46 is also provided with a combined image store 49 arranged to store combined images created during the image calibration process carried out by the image calibration apparatus 40, as will be understood by a skilled person. The combined image store is coupled to the image display 45 to supply combined images for display to a user.

In some embodiments, the image store 46 is also provided with a graphical data store 51 for storing graphical data generated by graphical data generator 52. The graphical data generator 52 is shown as part of the image calibration apparatus 40 in the exemplary embodiment, but in some embodiments the graphical data generator 52 may be provided externally to the image calibration apparatus 40, as will be apparent to a skilled person.

The image store 46 may be implemented in many different forms. In one embodiment, the image store 46 may be implemented as an image array. In some embodiments, the projected image store 48 and the combined image store 49 may be combined. In such a situation, for example which might occur when combining projected image from cameras as described with reference to FIGS. 2 and 4, projected image data from a first image may be written to positions in the image array corresponding to the output image positions. Projected image data from a second captured image that is to be combined with the projected image data from the first captured image is then written to the appropriate positions in the image array corresponding to the output image positions. Where projected images overlap, output data for a pixel in the output image can be formed from a combination of the projected image data, as will be known by a skilled person.

The image calibration apparatus 40 is also provided with an image processor 53, which carries out the processing of the images as described. In the illustrated embodiment, the image processor 53 is provided with an image projector 54, which is coupled to the captured image store 47 and to the projected image store 48. The image projector 54 is arranged to access captured images stored in the captured image store 47, and forms projected images by projecting the captured images onto a ground plane using camera pose parameter values for the respective camera that captured the image. The image projector 54 stores the projected images in the projected images store 48.

In the illustrated embodiment, the image processor 53 is also provided with an image combiner 55, which is coupled to the projected image store 48 and the graphical data store 51 as well as to the combined image store 49. The image combiner 55 is arranged to access one or more projected images in the projected images store 48 and to combine the projected images using camera pose parameter values to form combined images. The image combiner 53 is also arranged to access graphical data in the graphical data store 51, where available, and to combine the graphical data with one or more projected images from the projected images store 48, using camera pose parameter values to form output combined images. The image combiner 53 stores the combined images in the combined images store 49.

As discussed above, some or all elements of the function of image combiner 53 may be carried out by image projector 54. It will be understood that the projection and combination functions can be implemented in image processor 53 in a variety of ways within the scope of the invention.

The image calibration apparatus 40 is also provided with a camera pose parameter function 56, for determining values for the camera pose parameters 57 used in the image projection carried out by image projector 54 of image processor 53, and in the image combination carried out by the image combiner 55 of image processor 53. The camera pose parameter function 56 is coupled to the vehicle system 43 to receive suspension level information from the vehicle system 43. Typically, each camera mounted on the vehicle will have stored values for a set of camera pose parameters. The camera pose parameter function 56 is also coupled to the image processor 53 to supply camera pose parameter values 57 to the image processor 53.

As described above with reference to FIGS. 6a, 6b, and 6c, in some embodiments of the invention, current suspension level information can be used to determine the current position and orientation of the vehicle plane, and therefore of the cameras. The position and orientation of the vehicle plane can be compared with the position and orientation of the datum vehicle plane to compute an offset to the values of the camera pose parameters to determine current values for the camera pose parameters.

In some embodiments not all camera pose parameter values are updated using suspension level information.

The functions of the image calibration apparatus 40 can be implemented in many ways, as will be apparent to a skilled person. In particular, the functions of the image calibration apparatus 40 can be implemented as a stand-alone apparatus or as a distributed system. The camera pose parameter function 56 can be implemented as a function in another vehicle system.

Figure 8:
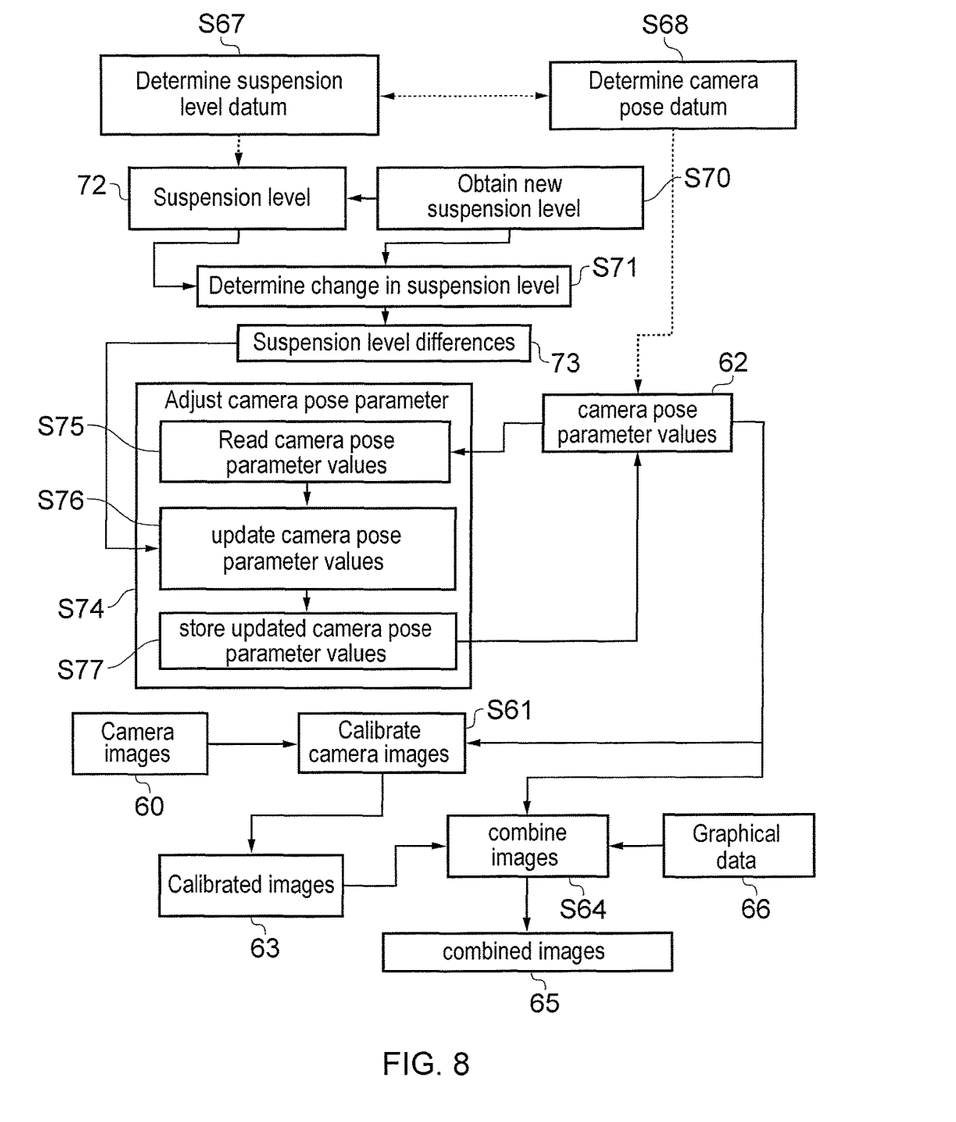
FIG. 8 is a flow chart illustrating the steps of a method in accordance with one embodiment of the invention.

FIG. 8 is a flow chart illustrating the steps of a method in accordance with one embodiment of the invention.

As will be clear from the preceding description, camera images 60 captured by a camera mounted on a vehicle are calibrated in step s61 using camera pose parameter values 62 that are determined from suspension level information, typically from a suspension system of the vehicle. The resulting calibrated images 63 may be combined in step s64, using the camera pose parameter values 62, to form combined images 65. In some embodiments, the calibrated images may be combined with graphical data 66 in step s64, using the camera pose parameter values 62, to form calibrated combined images 65.

The calibration of an image from a camera using pose parameter values will be known to a skilled person. As a result, the calibration of an image from a camera using pose parameter values 62 will not be described further in detail.

In embodiments of the invention, the camera pose parameter values 62 used in the step of calibrating s61 and in the step of combining s64 are determined using suspension level information from a suspension system of the vehicle. Typically, the camera pose parameter values 62 are periodically adjusted to take into account variations in the pose of the camera caused by load or handling variations, which otherwise would cause errors in the calibrated camera images.

This adjustment uses information relating to the variations in the suspension level of the vehicle. In particular, in some embodiments a difference in the suspension level compared with a suspension level datum is determined and camera pose parameter values are updated using the suspension level differences.

In one embodiment, a camera height parameter may be obtained by applying a determined difference in the suspension level to a camera height parameter datum at a known height relative to the ground. In this embodiment, variations in the suspension level of the vehicle, which can easily be measured, are used to determine variations in the height of the camera, which cannot easily be measured.

In order to determine the relationship between the suspension level and the values of pose parameters of the camera, a suspension level datum is determined in step s67 and a corresponding camera pose datum is determined in step s68. Typically, the suspension level datum and the camera pose datum are determined simultaneously, as shown by the dotted lines joining step s67 and step s68.

The step of determining the suspension level datum typically involves measuring the operating height of at least one wheel of the suspension system relative to the ground.

The values of the camera pose parameters when the camera is at the camera pose datum may be measured. These camera pose parameter values can be stored as initial camera pose parameter values, as shown by the dotted line between step s68 and the camera pose parameter values 62. Subsequent changes in the suspension level relative to the suspension level datum can be used to determine changes in the camera pose parameter values relative to the camera pose datum to obtain the current values for the camera pose parameters.

The suspension level datum is the suspension level when the camera is at the camera pose datum with known values for the camera pose parameters. Typically, the suspension level datum has a known relationship relative to the camera pose datum.

Typically the determination of the suspension datum and the camera pose datum can be carried out at the same time, for example during manufacturing of the vehicle, or at the time the image calibration apparatus 40 is fitted to the vehicle.

In some embodiments the offset from or difference between the current suspension level compared with the suspension level datum for each wheel is tracked and determined. In other embodiments, such as the one shown in FIG. 8 the current suspension level, and only the difference between successive suspension levels for each wheel is calculated.

Therefore in the embodiment shown in FIG. 7 when the values of camera pose parameters 62 are to be updated, in step s70 a new suspension level is obtained.

Next in step s71 the new suspension level is compared with the current suspension level 72 to determine the difference in the suspension level. Once the difference in the suspension level has been determined in step s71, the new suspension level obtained in step s70 can be stored as the suspension level, ready for the next iteration of adjusting the recorded values of the camera pose parameters.

The suspension level difference can then be used in a camera pose parameter adjustment step s74 to adjust the values of the camera pose parameters.

In a first camera pose parameter adjustment step s75, the current values of the camera pose parameters are read.

In a second camera pose parameter adjustment step s76, the current values of the camera pose parameter are updated using the determined suspension level difference 73.

In some embodiments, this step is achieved by calculating a new plane of the vehicle based on the suspension level measurements, and determining the change in the vehicle plane. From this, the camera pose parameter adjustment can be determined for each of the camera pose parameters.

Thereafter the determined camera pose parameter adjustment can be applied to the current value of the camera pose parameter to obtain an updated value for the or each camera pose parameter.

If the camera pose parameter adjustment is a positive number, the value of camera pose parameters are updated by adding the camera pose parameter adjustment to the existing value of the respective camera pose parameter. If the camera pose parameter adjustment is a negative number, the value of the camera pose parameter is updated by subtracting the camera pose parameter adjustment from the existing value of the respective camera pose parameter.

In a third camera height adjustment step s77, the updated values for the camera pose parameters can be stored as the current camera pose parameter values 62 to be used in calibrating images in step s61.

Thus a new method and apparatus for calibrating an image from a camera mounted on a vehicle using camera pose parameters is disclosed in which a value of the at least one camera pose parameter is determined using suspension level information of a suspension system of the vehicle and an image from a camera mounted on a vehicle is calibrated using the at least one camera pose parameter.

Other variations and modifications will be apparent to the skilled person. Such variations and modifications may involve equivalent and other features that are already known and which may be used instead of, or in addition to, features described herein. Features that are described in the context of separate embodiments may be provided in combination in a single embodiment. Conversely, features that are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A method comprising:
   receiving suspension level information of a suspension system of a vehicle, the suspension level information comprising an operating height of at least one wheel of the suspension system relative to a vehicle datum plane, the vehicle datum plane being a vehicle level when a plurality of cameras of the vehicle are at respective known positions and orientations relative to the ground, the vehicle datum plane having a fixed relationship with the position of the plurality of cameras;
   determining a new vehicle plane based on the received suspension level information;
   determining at least one camera pose parameter of the plurality of cameras mounted on the vehicle based on a difference between the new vehicle plane and the vehicle datum plane; and
   calibrating an image captured from at least one of the plurality of cameras mounted on a vehicle using the at least one camera pose parameter.

2. The method as claimed in claim 1, comprising
   determining a suspension level difference between a current suspension level and a previous suspension level of the vehicle;
   for at least one camera pose parameter, determining a camera pose parameter adjustment from the determined suspension level difference; and
   determining an updated value of the at least one camera pose parameter by applying the determined camera pose parameter adjustment to a current value of the at least one camera pose parameter.

3. The method as claimed in claim 2, wherein determining the updated value of the at least one camera pose parameter comprises:
   reading the current value of the camera pose parameter;
   forming an updated value of the at least one camera pose parameter by applying the determined camera pose parameter adjustment to the current value of the at least one camera pose parameter; and
   storing the updated value of the at least one camera pose parameter as a new current value of the camera pose parameter.

4. The method as claimed in claim 1, further comprising an initial step of determining a value of the at least one camera pose parameter when the camera is at the camera pose datum.

5. The method as claimed in claim 1, wherein the vehicle datum plane is at a known height difference relative to a camera height parameter datum.

6. The method as claimed in claim 1, wherein the value of the at least one camera pose parameter used to calibrate the image is the value of the at least one camera pose parameter associated with the suspension level at the time the image is captured.

7. The method as claimed in claim 1, wherein calibrating the image from the camera comprises: projecting the image on a plane using the value of the at least one camera pose parameter determined using suspension level information from a suspension system of the vehicle.

8. The method as claimed in claim 1, further comprising combining calibrated images with other image data using the value of the at least one camera pose parameter determined using suspension level information from the suspension system of the vehicle.

9. The method as claimed in claim 8, wherein the other image data is graphical data.

10. The method as claimed in claim 8, wherein the other image data is a calibrated image from another camera mounted on the vehicle.

11. The method as claimed in claim 1, further comprising displaying images to a user.

12. An apparatus comprising:
    a camera pose parameter function, coupled to receive suspension level information from a vehicle suspension system of a vehicle, the suspension level information comprising an operating height of at least one wheel of the suspension system relative to a vehicle datum plane, the vehicle datum plane being a vehicle level when a plurality of cameras of the vehicle are at respective known positions and orientations relative to the ground, the vehicle datum plane having a fixed relationship with the position of the plurality of cameras, the camera pose function further configured to determine a new vehicle plane based on the received suspension level information, and to determine a value of at least one camera pose parameter of the plurality of cameras based on a difference between the new vehicle plane and the vehicle datum plane; and an image processor, coupled to receive the value of the at least one camera pose parameter from the camera pose parameter function, and operable to calibrate images captured from at least one of the plurality of cameras mounted to the vehicle using the value of the at least one camera pose parameter.

* * * * *